3,479,315
ABS RESIN AND LUBRICANT

Lewis B. Weisfeld, Highland Park, N.J., assignor to Carlisle Chemical Works, Inc., Reading, Ohio, a corporation of Ohio
No Drawing. Filed Jan. 19, 1967, Ser. No. 610,227
Int. Cl. C08f 45/46, 41/10
U.S. Cl. 260—30.8      10 Claims

ABSTRACT OF THE DISCLOSURE

ABS resins are lubricated with organotin mercapto compounds which at the same time impart color stability.

---

This invention relates to improved resins of the acrylonitrile-butadiene-styrene type.

Such resins, marketed under the name of ABS resins, are increasingly used in a great number of varieties because they combine great impact strength with chemical resistance. While such ABS resins were originally mechanical blends of polybutadiene or copolymers thereof with acrylonitrile-styrene copolymers, they are now generally prepared by a graft copolymerization technique where, e.g., a mixture of acrylonitrile and styrene, which usually contains about 30 percent by weight of styrene and 70 percent by weight of acrylonitrile, is interacted under polymerizing conditions with a polybutadiene latex usually containing about 5 to 25 percent of solids. The resins can be modified by using modified components, e.g., methacrylic acid or methacrylates instead of acrylonitrile and/or methyl styrene instead of styrene. The term 'ABS" resin, as used herein, is understood to define broadly all these mixtures or terpolymers of whatever proportional composition.

Though ABS resins are marketed in a great variety of formulations and grades to meet widely differing specific requirements, there are still a number of unsolved problems. In order to assist processing of the resins, they will frequently contain lubricants to prevent sticking to the mills and to facilitate extrusion. Preferred lubricants are bis-amide-waxes; such waxes have, however, the drawback of causing darkening in unpigmented and light pastel stocks on continuous shearing. The all-ester waxes do not present this drawback but do not provide the required lubricity.

It is a principal object of this invention to provide resins of the character described which combine good color stability with good processing characteristics.

Other objects and advantages will become apparent from the specification and claims.

I have found that organotin mercapto compounds considerably improve the lubricity while imparting, at the same time, satisfactory color stability to the resins. Such organotin mercapto compounds are compounds containing an Sn—S bond and comprise straight organotin mercaptides, organotin derivatives of mercapto acids, mercapto alcohols, and thioacids, and similar compounds. Such compounds are well known in the polyvinyl chloride stabilizer art.

The organotin mercapto compounds are applied in amounts of 0.01 to 5, preferably 0.1 to 1.0 percent by weight of the resin, whereby the small percentages will be used particularly in combination with other lubricants.

Particularly suitable additives are mono, di, or trialkyl tin mercaptides or mercaptoacylates containing at least one Sn—S linkage, or those in which two Sn atoms are linked through an oxygen bridge to a bis compound. Also organotin mercapto compounds obtained by reaction of mercaptoacid esters with organostannoic acids in varying proportions may be used. Illustrative examples of mercapto compounds organotin dibutyl tin dioctyl mercaptide, 2,2-dioctyl or dibutyl - 1-oxa-2-stanna-3-thiocyclopentane-5-one, dibutyl tin bis butylmercapto acetate, dioctyl tin bis isooctylmercaptoacetate, dioctyl tin sulfide, dibutyl tin sulfide, dimethyl tin dicoconut mercaptide, dibutyl-tin distearyl mercaptide, butyl tin tridodecyl mercaptide, diethyl tin dicresyl mercaptide, octyl tin triphenyl mercaptide, phenyl tin tributyl mercaptide, methyl tin tricoconut mercaptide, dibutyltin dithioglycolic acid cyclohexyl ester, monobutyltin trithiopropionic acid hexyl ester, triphenyl tin thioglycolic acid benzyl ester, dilauryl tin dithiobutyric acid amy ester, dipropyl tin dithiovaleric acid tetrahydrofurfuryl ester, dibutyl tin S,S' bis (dibutyl thiomalate), dibutyl tin S,S', (bis) thiomalic acid).

Specific mixtures illustrating the invention are shown in the following examples, the proportions being given by weight.

EXAMPLE 1

Composition of blends with different lubricants:

|  | I | II | III |
|---|---|---|---|
| ABS resin | 100.0 | 100.0 | 100.0 |
| N,N'-distearoyl ethylene diamine | 2.0 | 1.9 | |
| Dibutyltin mercaptopropionate | | 0.1 | |
| Dibutyltin bis (tridecylmercaptide) | | | 0.5 |

The ABS resin consisted of 80 percent by weight of a 70/30 w./w. styrene-acrylonitrile resin (by solids) and 20 percent (by solids) of a 35/15/50 by weight styrene-acrylonitrile-polybutadiene graft polymerizate, i.e. it contained 10 percent by weight of polybutadiene.

The dibutyltin mercaptopropionate had the formula

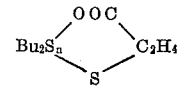

The blends were milled on a two-roll at 350° F. Blend I stuck to the mill in 20 minutes and blend III in 28 minutes. Blend II showed no sticking within 90 minutes. Blend I, i.e. the blend without organotin mercapto compounds, darkened faster and more than blends II and III.

EXAMPLE 2

In this example, the mixture I of Example 1 was kneaded in a two-roll mill at 375° F. with addition of various organotin mercapto compounds as shown in the following tables.

| Organotin mercapto compound | Percent by weight | Time to sticking min. |
|---|---|---|
| None | | 6 |
| Dibutyltinmercaptopropionate | 0.1 | 16 |
| Dibutyltin bis(isooctylacetomercaptide) | 0.2 | 12 |
| Dibutyltin bis(isooctylacetomercaptide) | 0.4 | 9 |
| Dibutyltin bis(lauryl mercaptide) | 0.2 | 19 |
| Dibutyltin bis(lauryl mercaptide) | 0.4 | 34 |
| Bis(monobutyltindiisoocylmercapto-propionate) oxide | 0.2 | 17 |
| Bis(monobutyltindiisoocylmercapto-propionate) oxide | 0.4 | 40 |

The last named compound is a slightly viscous straw colored liquid of the formula

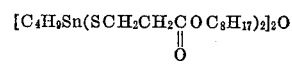

It is obtained as follows:
208.7 g. (1.0 mole) of butylstannoic acid and 250 ml. of toluene were charged to a three-neck flask and dehydrated via azeotropic distillation at 120° C. under atmospheric pressure.

436.8 g. (2.0 moles) of isooctyl beta mercaptopropionate were added to the thus obtained product, and the reaction mixture was stripped by heating first for 30 minutes at a temperature of 120° C. and a pressure of 90 mm. Hg and then for additional 30 minutes at 155° C. and 15 mm. Hg.

The compounds of this type, which are generally prepared by the reaction of 2 moles of a mercaptoacid ester with 1 mole of an organostannoic, described in more detail in applications Ser. Nos. 427,487 and 471,718, for "Polymeric Stannoic Acid Products," filed by Ingenuin Hechenbleikner et al. Jan. 22 and July 13, 1965, now U.S. Patents 3,396,185 and 3,413,264, respectively.

I claim:
1. A thermoplastic composition comprising a blend of
   (a) a copolymer prepared from a monomer of the group consisting of styrene and methyl styrene and a monomer of the group consisting of acrylonitrile, methacrylonitrile, methacrylic acid and esters thereof and
   (b) a rubbery material selected from the group consisting of terpolymers formed by copolymerizing the monomers of (a) in the presence of polybutadiene and copolymers of butadiene with acrylonitrile and
as a lubricant an alkyltin compound wherein the tin is connected to the sulfur of a mercapto acid or an ester thereof in an amount of 0.01 to 5 percent by weight of said composition.

2. A thermoplastic composition as claimed in claim 1 wherein said lubricant is an alkyl tin mercaptide of the formula

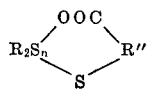

wherein R is an alkyl having 4 to 8 carbon atoms and R'' is an alkylene group having 1 to 8 carbon atoms.

3. A thermoplastic composition as claimed in claim 2 wherein said lubricant is dibutyltin mercaptopropionate.

4. A thermoplastic composition as claimed in claim 1 wherein said lubricant is an alkyl tin mercapto compound of the formula $$R_nSn(SR''COOR')_{4-n}$$

wherein R is an alkyl having 4 to 8 carbon atoms, R' is alkyl having 4 to 18 carbon atoms, R'' is an alkylene group having 1 to 8 carbon atoms and $n$ is an integer between 1 and 3.

5. A thermoplastic composition as claimed in claim 4 wherein said lubricant is dibutyltin bis (isooctylacetomercaptide).

6. A thermoplastic composition as claimed in claim 1 wherein said lubricant is a bis (monoalkyltin dialkylmercapto carboxylate) oxide of the formula $$[RSN(SR''COOR')_2]_2O$$

wherein R is an alkyl having 4 to 8 carbon atoms, R' is alkyl having 4 to 18 carbon atoms, and R'' is an alkylene group having 1 to 8 carbon atoms.

7. A thermoplastic composition as claimed in claim 6 wherein said lubricant is bis (monobutyltindiisooctylmercaptopropionate) oxide.

8. A thermoplastic composition as claimed in claim 1 wherein said composition contains 30 to 90 percent (a) blended with 10 to 70 percent of said terpolymer, said terpolymer containing 40 to 90 percent (a) polymerized in the presence of 10 to 60 percent polybutadiene and the monomers of (a) are polymerized in amounts of 50 to 99 percent with 1 to 50 percent respectively.

9. A thermoplastic composition as claimed in claim 1 wherein said composition contains 35 to 95 percent (a) blended with 5 to 65 percent of a copolymer of butadiene with acrylonitrile and the monomers of (a) are polymerized in amounts of 50 to 99 percent with 1 to 50 percent respectively.

10. A thermoplastic composition as claimed in claim 1 wherein said composition contains 80 percent (a) blended with 20 percent (b), (a) is a copolymer of 70 percent styrene with 30 percent acrylonitrile and (b) is a terpolymer of 35 percent styrene, 15 percent acrylonitrile with 50 percent polybutadiene.

References Cited

Noller: Chemistry of Organic Compounds, 3rd edition, W. B. Saunders, Philadelphia (1965), p. 328.

MORRIS LIEBMAN, Primary Examiner

P. R. MICHL, Assistant Examiner

U.S. Cl. X.R.
260—45.7, 45.75